United States Patent
Lescot et al.

(10) Patent No.: US 11,781,838 B2
(45) Date of Patent: Oct. 10, 2023

(54) SAFETY GLAZING

(71) Applicant: AGC GLASS EUROPE, Gosselies (BE)

(72) Inventors: Thomas Lescot, Reves (BE); Louis Dellieu, Waret-la-Chaussée (BE); Bertrand Mathy, Gosselies (BE)

(73) Assignee: AGC GLASS EUROPE, Gosselies (BE)

( * ) Notice: Subject to any disclaimer, the term of this patent is extended or adjusted under 35 U.S.C. 154(b) by 274 days.

(21) Appl. No.: 17/288,350

(22) PCT Filed: Oct. 22, 2019

(86) PCT No.: PCT/EP2019/078754
§ 371 (c)(1),
(2) Date: Apr. 23, 2021

(87) PCT Pub. No.: WO2020/083928
PCT Pub. Date: Apr. 30, 2020

(65) Prior Publication Data
US 2021/0381808 A1    Dec. 9, 2021

(30) Foreign Application Priority Data

Oct. 23, 2018  (EP) .................................. 18202087

(51) Int. Cl.
*B32B 17/06*      (2006.01)
*B32B 15/04*      (2006.01)
(Continued)

(52) U.S. Cl.
CPC ..... *F41H 5/0407* (2013.01); *B32B 17/10045* (2013.01); *B32B 17/1055* (2013.01);
(Continued)

(58) Field of Classification Search
CPC ...................... B32B 17/10311; B32B 2250/05
(Continued)

(56) References Cited

U.S. PATENT DOCUMENTS 4,071,649 A * 1/1978 Jacquemin ........ B32B 17/10311
                                                   428/920
4,173,668 A * 11/1979 Hentzelt ................... E06B 7/28
                                                   428/920
(Continued)

FOREIGN PATENT DOCUMENTS

CA         3 032 373 A1    2/2018
CN         104924705 A     9/2015
(Continued)

OTHER PUBLICATIONS

International Search Report dated Jan. 22, 2020 in PCT/EP2019/078754 filed Oct. 22, 2019, citing documents AO-AR therein, 2 pages.

*Primary Examiner* — Lauren R Colgan
(74) *Attorney, Agent, or Firm* — Oblon, McClelland, Maier & Neustadt, L.L.P.

(57) ABSTRACT

A fireproof/bullet-proof safety glazing that includes a laminated assembly I of glass sheets, the laminate I, the glass sheets of which are assembled by means of thermoplastic interlayer sheets and n layers of intumescent material made from hydrated alkali silicate, with 1≤n≤3. The laminate I also includes a fireproof module comprising the n layers of intumescent material made of hydrated alkali silicate and n+1 glass sheets, the module being flanked on either side by at least one interlayer thermoplastic sheet and at least one glass sheet. The laminate I does not include organic glass sheets made from a polymer material that is rigid at ambient temperature. The glazing includes at least six glass sheets.

19 Claims, 2 Drawing Sheets

Figure 1:
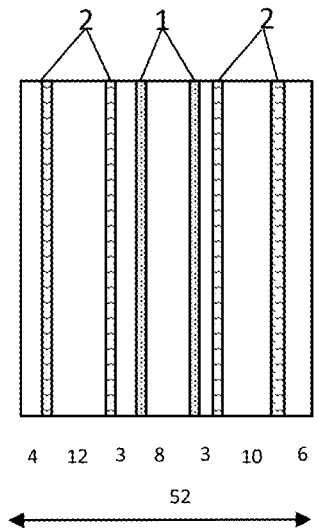

(51) Int. Cl.
  *F41H 5/04*  (2006.01)
  *B32B 17/10*  (2006.01)
(52) U.S. Cl.
  CPC ..... *B32B 17/10311* (2013.01); *B32B 2250/05* (2013.01); *B32B 2307/3065* (2013.01); *B32B 2307/412* (2013.01); *B32B 2307/732* (2013.01); *B32B 2571/02* (2013.01)
(58) Field of Classification Search
  USPC .......................................... 428/426, 428, 432
  See application file for complete search history.

(56) References Cited

U.S. PATENT DOCUMENTS

| | | | | |
|---|---|---|---|---|
| 4,444,825 | A * | 4/1984 | Vanderstukken | B32B 17/10311 |
| | | | | 428/920 |
| 5,434,006 | A * | 7/1995 | Goelff | B32B 17/069 |
| | | | | 428/920 |
| 5,496,640 | A * | 3/1996 | Bolton | B32B 17/10311 |
| | | | | 428/920 |
| 11,097,980 | B2 * | 8/2021 | Hermens | B32B 17/10311 |
| 2006/0257668 | A1 * | 11/2006 | Frommelt | B32B 17/10045 |
| | | | | 428/428 |

FOREIGN PATENT DOCUMENTS

| | | |
|---|---|---|
| EP | 3 309 501 A1 | 4/2018 |
| WO | WO 2008/084083 A1 | 7/2008 |

* cited by examiner

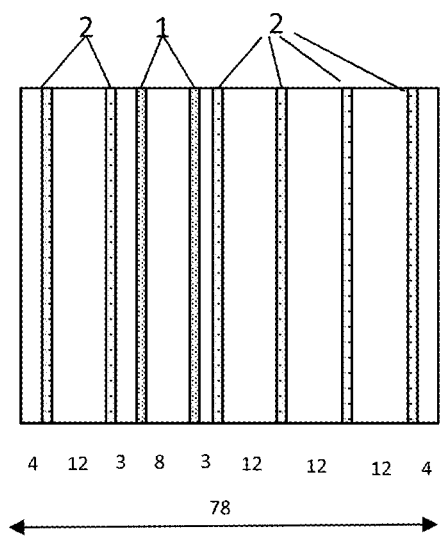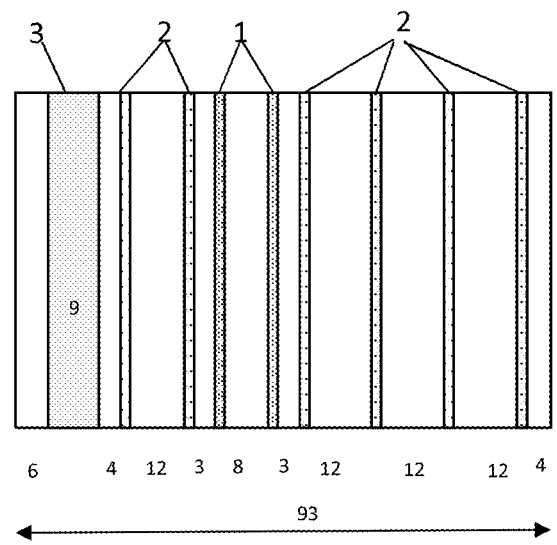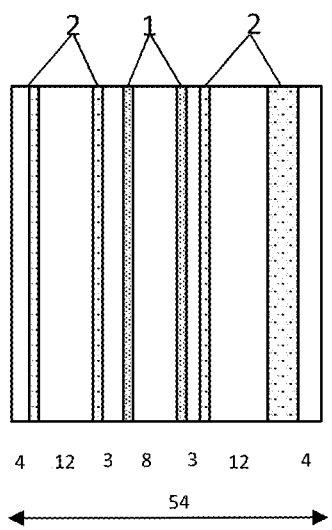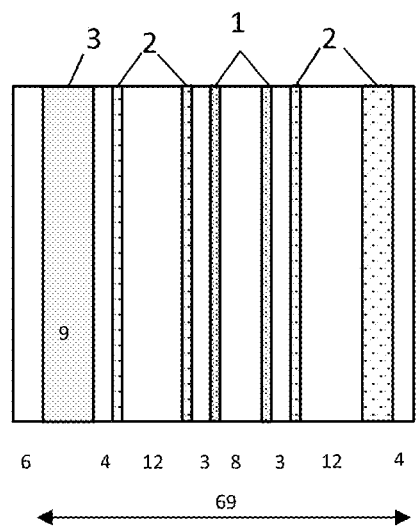

SAFETY GLAZING

The invention relates to glazings that simultaneously exhibit properties of resistance to bullet impacts, explosions or intrusion, for the one part, and to fire, for the other part, the two being able to occur independently, simultaneously or in succession. In the following text, to avoid repetition, these glazings will be referred to as being bulletproof.

In practice, the products intended for protection against impacts are made up of a multiplicity of sheets intended to absorb the energy of projectiles. The sheets are joined together by an adhesive, which may be made up of thermoplastic sheets.

Usually, the glazings in question are made up of glass sheets, but generally materials known as organic glasses, since they afford transparency similar to that of mineral glasses, supplement the assemblies and give them a high level of resistance. These materials that are rigid at ambient temperature are for example polycarbonates, poly(methyl methacrylates) or the like and are normally disposed in sheets of a certain thickness. The materials in question do not normally constitute a way of securing glass sheets together. In laminated assemblies, the adhesion thereof to the glass sheets requires the use of specific glues. The association of "mineral" glass sheets and "organic" glass sheets furthermore creates in particular problems linked to the differences in coefficient of thermal expansion, in particular when the glazings are subjected to significant variations such as those of exposed glazings on building façades. These differences tend to prompt the delamination of these assemblies. These materials, apart from their lower breaking weakness compared with glass sheets, have the particular feature of a density much lower than that of glass, but this saving of weight is offset by a much greater cost. Glazings of this type are described for example in the publication EP2439066, said publication also referring to the proposed products as being fireproof. The presence of these organic glasses in a significant amount is not desirable, however, on account of their behavior with respect to fire, since, on burning, they release harmful fumes. Similar publications are for example WO2188/015066 or DE202010008729U. Furthermore, the materials in question do not have optical properties that are stable over time. Many of them tend to yellow and their transparency changes.

Other publications propose glazings without these organic glasses to avoid the drawbacks indicated above. To improve the behavior of these "bulletproof" laminates with respect to fire, the glass sheets are assembled by means of specific adhesives which, although organic, are flame-proof or sufficiently fireproof. The publication EP2090427 has this kind of subject matter.

Lastly, proposals have been made to make glazings of this type, which, in addition, exhibit increased fire resistance. Generally, the glazings that exhibit increased fire resistance are made up of assemblies of fireproof units or modules made up of three glass sheets joined by means of two intumescent layers, a plurality of modules (2 or 3) being associated by means of thermoplastic sheets. These glazings, which are designed in principle for their fireproof property, on account of the multiplicity of assembled glass sheets, also exhibit mechanical properties that allow them to have a bulletproof or anti-intrusion role. One difficulty with this type of glazing is associated with the large number of intumescent/fireproof layers, which results in the optical defects potentially encountered in each of the intumescent layers "adding up", resulting in high rejection rates during the production thereof.

The inventors have sought means for simultaneously meeting requirements in terms of fire protection for glazings which are primarily intended to ensure good mechanical strength, and more particularly strength of the bulletproof type, and which do not require the presence of large amounts of organic glasses of the polycarbonate type or the like, and which exhibit a high level of transparency.

At the same time, the inventors have sought to produce the glazings in question by using, as much as possible, elements that are already available so as to make it easier to produce them and reduce their cost. The inventors have thus proposed assemblies that are usable for the different requirements encountered, be these glazings situated on the inside of buildings, doors, partitions, or situated on building façades, in particular insulating glazings, while endeavoring to limit the thickness of these glazings and the weight thereof.

Advantageously and unexpectedly, the applicants have now discovered that it is possible to achieve this objective by producing a glazing according to the present invention.

The present fireproof/bulletproof safety glazing comprises a laminated assembly of glass sheets I, the laminate I,
 the glass sheets of which are assembled by means of thermoplastic interlayer sheets made of thermoplastics such as PVB, EVA, PU, ionomers, cycloolefin polymers, and by means of n layers of intumescent material based on hydrated alkali metal silicate, where $1 \leq n \leq 3$,
 comprising a fireproof module comprising said n layers of intumescent material based on hydrated alkali metal silicate and n+1 glass sheets, said module being flanked on either side by at least one thermoplastic interlayer sheet and at least one glass sheet, and
 not comprising an organic glass sheet based on polymer material such as polycarbonate, polymethyl methacrylate, material rigid at ambient temperature,
 the laminate I optionally being associated either with a glass sheet or with a second laminated assembly II made up of glass sheets assembled by means of thermoplastic interlayer sheets made of thermoplastics such as PVB, EVA, PU, ionomers, cycloolefin polymers, a space being maintained between the laminate I and either the glass sheet or the laminate II,
 the glazing comprising at least 6 glass sheets.

Various embodiments of the present glazing are illustrated in FIGS. 1 to 8.

FIGURES

FIG. 1: a glazing according to the invention is made up of 7 glass sheets with thicknesses of 4, 12, 3, 8, 3, 10 and 6 mm, starting from the leading face on the extreme left-hand side of FIG. 1, with the fireproof module comprising 2 intumescent layers (1) and 3 glass sheets, flanked on either side by 2 glass sheets and 2 thermoplastic sheets (2), for a total thickness of 52 mm.

Figure 2:
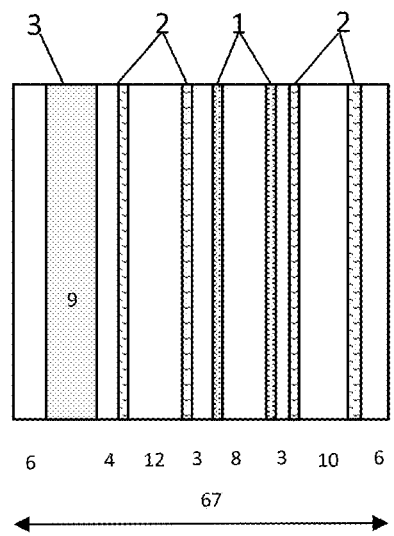

FIG. 2: a glazing according to FIG. 1 is associated with a 6 mm glass sheet via a 9 mm space (3) between the components, for a total thickness of 67 mm; the 6 mm glass sheet forming the leading face.

Figure 3:
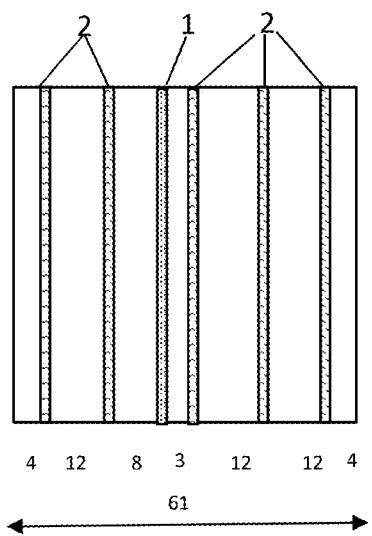

FIG. 3: a glazing according to the invention is made up of 7 glass sheets with thicknesses of 4, 12, 8, 3, 12, 12 and 4 mm, starting from the leading face on the extreme left-hand side of FIG. 3, with the fireproof module comprising 1 intumescent layer (1) and 2 glass sheets, flanked on one side (on the leading face side) by 2 glass sheets and 2 thermoplastic sheets (2) and on the other side (on the protective face side) by 3 glass sheets and 3 thermoplastic sheets, for a total thickness of 61 mm.

Figure 4:
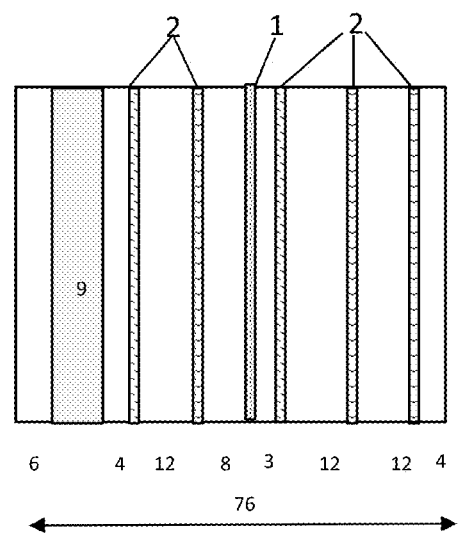

FIG. 4: a glazing according to FIG. 3 is associated with a 6 mm glass sheet via a 9 mm space (3) between the components, for a total thickness of 76 mm; the 6 mm glass sheet forming the leading face.

FIG. 5: a glazing according to the invention is made up of 9 glass sheets with thicknesses of 4, 12, 3, 8, 3, 12, 12, 12 and 4 mm, starting from the leading face on the extreme left-hand side of FIG. 5, with the fireproof module comprising 2 intumescent layers (1) and 3 glass sheets, flanked on one side (on the leading face side) by 2 glass sheets and 2 thermoplastic sheets (2) and on the other side (on the protective face side) by 4 glass sheets and 4 thermoplastic sheets, for a total thickness of 78 mm.

FIG. 6: a glazing according to FIG. 5 is associated with a 6 mm glass sheet via a 9 mm space (3) between the components, for a total thickness of 93 mm; the 6 mm glass sheet forming the leading face.

FIG. 7: a glazing according to the invention is made up of 7 glass sheets with thicknesses of 4, 12, 3, 8, 3, 12 and 4 mm, starting from the leading face on the extreme left-hand side of FIG. 1, with the fireproof module comprising 2 intumescent layers (1) and 3 glass sheets, flanked on either side by 2 glass sheets and 2 thermoplastic sheets (2), for a total thickness of 54 mm.

FIG. 8: a glazing according to FIG. 7 is associated with a 6 mm glass sheet via a 9 mm space (3) between the components, for a total thickness of 69 mm; the 6 mm glass sheet forming the leading face.

The fireproof module is therefore an assembly having a fireproof function comprising n layers of intumescent material based on hydrated alkali metal silicate and n+1 glass sheets, where $1 \leq n \leq 3$.

The laminate I is made up of an assembly of glass sheets assembled from thermoplastic interlayer sheets, within which the fireproof module is inserted, from at least one thermoplastic interlayer sheet and at least one glass sheet on either side of its structure. As a result, at least one glass sheet and one thermoplastic interlayer sheet are located on either side of the fireproof module, in the laminate I.

In the scope of the invention as a whole, in the absence of a glass sheet and of a second laminated assembly II, the glazing claimed is made up only of the laminate I, comprising at least 6 glass sheets.

The properties of resistance to bullet impacts, to explosions or to intrusion are conferred by the glazing claimed, to which are added the properties of fire resistance conferred by the fireproof module integrated within the laminate I, in said glazing.

The leading face is defined here as being the first glass sheet on the side likely to suffer an impact; the protective face is defined here as being the last glass sheet starting from the side likely to suffer an impact, the protective face typically being the first glass sheet oriented toward the protected side of the glazing.

The present glazing is assembled such that the fireproof module does not form the leading face of the bulletproof glazing, likely to be exposed to impacts. The present glazing is assembled such that the fireproof module also does not form the protective face (face on the opposite side from the leading face). The leading face and the protective face are situated on either side of the fireproof module, separated from the latter by at least one thermoplastic interlayer sheet.

Without wishing to limit the present invention to any one theory, it would appear that the disposition of the fireproof module within the glazing allows the fireproof module to partially dissipate and partially absorb the energy produced as a result of the impact with the leading face through the rest of the glazing. At the leading face, the glass sheets forming the fireproof module would be likely to break, during one or more impacts, having the detrimental consequences of generating glass fragments and thus deteriorating the bulletproof function, and/or deteriorating the fireproof function. At the protective face, the rigidity, and therefore the lack of a deformation capability, of the fireproof module could have a negative effect on the function of protection and of shock absorption following the impact.

On account of its disposition within the glazing, and separated from the leading and protective faces by at least one thermoplastic interlayer sheet and at least one glass sheet, the fireproof module is protected by at least one first glass sheet. In a situation involving multiple impacts, the leading face, which is likely to break, will maintain its structure by virtue of the first thermoplastic interlayer sheet. Behind this leading face and said thermoplastic interlayer sheet, the fireproof module could itself also be damaged. If the external sheet of the fireproof module, behind the at least first glass sheet of the leading face, were to break, the presence of the first thermoplastic interlayer sheet would prevent it from collapsing. The fireproof module, although damaged, could hence maintain its fireproof function and also, advantageously, participate in dissipating the energy following the impact, or other successive impacts. It is thus advised to position the fireproof module within the glazing in order that it participate in the dissipation of the shock following the impact, and maintain its fireproof function.

In practice, the glazings according to the invention do not comprise organic glasses, rigid materials, such as the polycarbonates used previously.

The impact resistance of the present glazing results essentially from the assembly of glass sheets, which are associated with one another by means, for the one part, of conventional thermoplastic sheets for forming laminates such as sheets of PVB, EVA, PU, ionomers, cycloolefin polymers or the like, and, for the other part, by means of one or more layers of intumescent material based on hydrated alkali metal silicate. This assembly is referred to as "laminate I" in the following text.

Optionally, to form insulating glazings, this assembly may also be associated, in a known manner, with a glass sheet or another laminated assembly, referred to as "laminate II", with a space being provided between these components.

For glazings intended to protect against the impact of projectiles, the importance of total glass thickness is a major factor for countering the kinetic energy of the projectile at the impact point. The number of sheets in the assembly is consequently an important factor. For their part, the interlayer sheets promote the absorption of the deformations of the successive glass sheets after the face exposed to the impact.

According to the invention, to meet the most limited requirements in terms of impact resistance, the glazings comprise at least six glass sheets.

Preferably, depending on the required performance aspects, the total thickness of the glass sheets of the glazing is not less than 35 mm, and particularly preferably not less than 40 mm.

Furthermore, preferably, to fully play its part and in particular to add a certain "inertia" to the assembly and contribute toward mechanical absorption, each glass sheet has a thickness of at least 2.5 mm and preferably at least 3 mm.

The resistance of the sheets to impacts, or even to thermal shock, does not increase proportionally to their individual thickness. The rupture initiated in a glass sheet propagates depending on the stresses inherent to these sheets. Note that organic glasses are much less sensitive to the propagation of rupture initiating cracks. Overall, it may be preferable, for an identical overall thickness, to use several sheets rather than one. For this reason, in the glazings according to the invention, the glass sheets preferably have a thickness that is not greater than 16 mm, and preferably not more than 14 mm.

In glazings having, in addition to the laminate I, a glass sheet, the latter preferably has a thickness of 5 to 16 mm, and in those having a laminate II, the latter preferably comprises at most 6 glass sheets with a thickness of 3 to 16 mm.

The space maintained between the laminate I and the glass sheet or the laminate II is preferably from 6 to 14 mm.

Advantageously, one or more glass sheets of the present glazing is/are mechanically reinforced by a thermal or chemical treatment (tempering, hardening). When such sheets are used, they are preferably disposed on the opposite faces to those exposed to possible impacts, and therefore the protective faces. Such sheets have the particular feature of better resistance to the deformation stress before, as the case may be, breaking into a large number of small fragments. The presence of sheets treated in this way is offset by the possibility of cutting the glazings being limited, meaning that the latter have to be set to the required dimensions from the outset.

Resistance increases with the number of sheets. However, this number and the thickness of the sheets are limited in practice for reasons of bulkiness, weight, and cost of producing the glazing. For these reasons, the total number of glass sheets in the laminate I is preferably at most 12, and particularly preferably at most equal to 10. Similarly, the total number of glass sheets in the entire glazing, including the sheets separate from the laminate I, is preferably at most equal to 14. The total thickness of the glass sheets is preferably not greater than 150 mm and particularly preferably not greater than 110 mm.

The material of the glass sheets is most commonly a glass of the soda-lime-silica type for cost reasons, but it may also be glass of the aluminosilicate or borosilicate type, these being glasses that are known to have a more refractory nature.

The soda-lime-silica glasses may also correspond to the qualities known as "extra-clear", these being glasses in which the iron content is at a minimum and which, consequently, have little coloration. This property is all the more advantageous given that the thickness of the glazing tends to accentuate the green tint. However, the use of extra-clear glasses is more expensive.

The best-performing fireproof glazings are traditionally made up of a laminated assembly associating glass sheets and, between the latter, layers of materials that react when exposed to heat, so as to form a screen not only to flames and fumes but also to thermal radiation. The materials based on hydrated alkali metal silicates, which are chosen in particular to provide, under well-defined conditions, transparency to radiation in the visible range, resulting in them sometimes being called "water glass", make a limited contribution to the mechanical properties. In particular, they do not confer significant plasticity on the glazings in question.

In practice, the assembly made up of an intumescent layer with the two glass sheets situated on either side thereof behaves mechanically in the laminated glazing approximately as if the intumescent layer replaced a monolithic glass sheet of equivalent thickness, or even better. In this regard, this "sheet" obviously contributes toward the desired mechanical properties.

Moreover, it has been found that, in a drop test using a 0.510 kg steel ball with a diameter of 5 cm, a sheet of glass, with dimensions of 30 by 30 cm and a thickness of 15 mm, breaks when the ball drops from a height of 1.5 m, whereas a fireproof module, with dimensions of 30 by 30 cm, made up of 3 sheets of glass of 3, 8 and 3 mm and 2 intumescent layers each having a thickness of 1.5 mm, breaks when the ball drops from a height of 3.5 m. The fireproof module, on account of its entire structure, therefore contributes toward the energy dissipation properties of the glazing as a whole.

In experiments, the inventors found that the assemblies made up of glass sheets assembled by means of thermoplastic sheets made of thermoplastics such as PVB, EVA, PU, ionomers or cycloolefin polymers, already have non-negligible fire resistance properties. While the material of the thermoplastic sheets burns at high temperature, the multiplicity of sheets of the assembly results in progressive destruction, sheet by sheet, of the assembly, this progression considerably slowing down the complete destruction of the glazing, even in the absence of an intumescent layer.

For this reason, in assemblies according to the invention that have a multiplicity of glass sheets, a fireproof module comprising one intumescent layer, of normal thickness, for example from 1.5 to 3 mm, makes it possible, where appropriate, to meet the not very demanding and satisfactory conditions of fire resistance. The layers in question may also have much greater thicknesses, ranging for example up to 10 mm. The nature of the alkali metal silicate chosen, and in particular the $SiO_2/M_2O$ molar ratio (M being an alkali metal), and the water content, in a known manner, also make it possible to increase the quality of fire resistance.

However, according to the invention, the preferred modules have more than one intumescent layer with a thickness at least equal to the values indicated above (1.5-3 mm). The most common combinations comprise two or three intumescent layers, and most frequently two layers. Preferably, these 2 layers are situated on either side of a single glass sheet. This glass sheet/layer/glass sheet/layer/glass sheet structure present within the laminate I, in the preferred glazings according to the invention, affords the advantage of maintaining the sheets after the first intumescent layer has expanded and comes away from the most exposed glass sheet, which has already broken, adding to the resistance time of the assembly. This structure is furthermore that of very widespread fire resistant glazings. The use of what then constitutes a traditional fireproof module in the glazing according to the invention is even more economical.

The possible use of more than three intumescent layers would result in increasing complexity, necessarily bringing about extra costs. The choice of limiting the number of layers preferably to one or two, besides the fact indicated above that this number of intumescent layers makes it possible to achieve the most useful fireproof performance for these dual function (fireproof/bulletproof) glazings, reduces the amount of products rejected on account of defects. Specifically, while the laminated assemblies made up only of glass sheets associated by means of thermoplastic sheets traditionally have few optical defects, the intumescent layers are known to very often exhibit haze or bubbles, these only being acceptable within limits of very small dimensions. The multiplication of the intumescent layers necessarily increases the total amount of defects and, consequently, the reject rate. This rate is all the more prohibitive given that the usual assembly techniques (in particular autoclaving) are likely to increase the number of these defects.

The presence of the 1 to 3 intumescent layers within the glazing, connected to the multiplicity of glass sheets, gives the glazings according to the invention at least basic fireproof properties, namely those of class EI 30. However, the performance aspects may be much better depending on the complexity of the glazing formed, in particular EW 60 and/or EI 60.

In the classifications of glazings, EI denotes those that form an obstacle to flames and fumes and constitute heat conduction insulation; EW denoting those that form an obstacle to flames and fumes and to the transmission of heat by radiation. The number indicates the time in minutes of resistance in the tests carried out. The test conditions follow the protocol of standards EN1363 and EN1364.

The quality and the production of the intumescent layers based on hydrated alkali metal silicates is the subject of many prior publications. See for example EP1855878, EP1960317, EP1993828, EP2361223, EP2480041. The fire resistance properties of the intumescent materials lead to the preference for products having strong refractory characteristics, even if the mechanical characteristics are also modified somewhat thereby. These products are those in which the $SiO_2/M_2O$ molar ratio, M being an alkali metal, is relatively high, for example around 3 to 7, and particularly 3.4 to 5.5.

Besides the molar ratio, the water content of the silicates comes to bear in their behavior with respect to fire. Depending on the production techniques, the water content is between 20% and 45% by weight of the material. Preferably, "dried" intumescent layers in which the water content is not greater than 30% by weight are used.

The intumescent layers may also contain additives that modify certain properties thereof. These are in particular polyols, ethylene glycol or glycerol, which give these solid layers a certain "plasticity". These polyols are advantageously in an amount of less than 20%, and preferably less than 17%, by weight of the intumescent material.

The multiplicity of glass sheets (at least 6) in the glazing results in the necessary presence of thermoplastic sheets. There are preferably at least three of these. The role of the thermoplastic sheets, as indicated above, is mainly the assembly of the glass sheets in a "laminated" structure. In this role, these sheets may be relatively thin. In traditional glazings made up of laminates, the thermoplastic sheets have a thickness greater than 0.30 mm. Usual commercial thicknesses for PVB sheets are 0.38 and 0.76 mm. These same sheets, if necessary. may be superposed, resulting in much greater thicknesses. The association thereof is facilitated by the fact that they can stick to one another to form a compact and homogeneous assembly.

The laminate I is made so as not to require a spacer. In fact, the laminate I does not have a spacer and the sheets that make up said laminate I are kept together either by a thermoplastic sheet or, for the sheets of the fireproof module, via an intumescent layer.

The thermoplastic sheets made of PVB, EVA, PU, ionomers, or cycloolefin polymers, in contrast to organic glasses made up of rigid plastics, polycarbonates, polymethacrylates or the like, maintain a certain plasticity at ambient temperature. They are not "brittle". This particular feature adds impact resistance, by absorbing some of the corresponding energy. Their presence in the laminates of the glazings according to the invention nevertheless remains essentially linked to their adhesive role.

Under certain circumstances, the presence of at least one thermoplastic sheet on each external glass sheet of the fireproof module advantageously provides UV protection on either side of the fireproof module.

For the reasons indicated above, the presence of organic materials, which are sensitive to temperatures corresponding to fire exposure, do not contribute to the fireproof properties of the glazings according to the invention. It is therefore preferable to ensure that the amount of these materials remains limited. For this reason, sheets of small thickness are most common, and the overall mass of organic material makes up no more than $1/10$ of the mass of the glazing, and preferably no more than $1/20$.

Depending on the use conditions, it is possible to include in the glazing one or more thermoplastic sheets with a thickness of up to 5 mm. However, in these structures, the thick sheet(s) of thermoplastic material are disposed in the structure preferably such that they are not in the immediate vicinity of the face of the glazing that is likely to be exposed to fire. Preferably, the thick sheet is separated from this face by at least two glass sheets.

Under certain circumstances, the fireproof module may prove to be an asset for the esthetic appearance of the glazing on account of its possible composition of extra-clear glass, providing the same mechanical properties as, or better mechanical properties than, a thicker glass sheet (for example 15 to 18 mm), with, moreover, a less greenish appearance.

According to the following first and second alternative embodiments of the invention, the fireproof module may be flanked on one side by at least one thermoplastic interlayer sheet and at least one glass sheet and on the other side by at least 2 thermoplastic interlayer sheets and at least 2 glass sheets.

According to the first alternative embodiment of the invention, a fireproof/bulletproof safety glazing may comprise a laminated assembly of glass sheets I, the laminate I,
  the glass sheets of which are assembled by means of
    thermoplastic interlayer sheets made of thermoplastics
    such as PVB, EVA, PU, ionomers, cycloolefin polymers, and by means of n layers of intumescent material
    based on hydrated alkali metal silicate, where $1 \leq n \leq 3$,
  comprising a fireproof module comprising said n layers of
    intumescent material based on hydrated alkali metal
    silicate and n+1 glass sheets, said module being
    flanked, independently of whether the side in question
    is the leading side or the protective side, on one side by
    at least one thermoplastic interlayer sheet and at least
    one glass sheet and on the other side by at least 2
    thermoplastic interlayer sheets and at least 2 glass
    sheets, and
  not comprising an organic glass sheet based on polymer
    material such as polycarbonate, poly(methyl methacrylate), material rigid at ambient temperature;
  the laminate I optionally being associated either with a glass
    sheet or with a second laminated assembly II made up of
    glass sheets assembled by means of thermoplastic interlayer
    sheets made of thermoplastics such as PVB, EVA, PU,
    ionomers, cycloolefin polymers, a space being maintained
    between the laminate I and either the glass sheet or the
    laminate II,
  the glazing comprising at least 6 glass sheets.

According to this first alternative embodiment, the asymmetry may be independent of the side in question, namely on the leading face side or the protective face side.

According to the second alternative embodiment of the invention, a fireproof/bulletproof safety glazing may comprise a laminated assembly of glass sheets I, the laminate I,
  the glass sheets of which are assembled by means of thermoplastic interlayer sheets made of thermoplastics such as PVB, EVA, PU, ionomers, cycloolefin polymers, and by means of n layers of intumescent material based on hydrated alkali metal silicate, where 1≤n≤3, comprising a fireproof module comprising said n layers of intumescent material based on hydrated alkali metal silicate and n+1 glass sheets, said module being flanked on the leading face side by at least one thermoplastic interlayer sheet and at least one glass sheet and on the protective face side by at least 2 thermoplastic interlayer sheets and at least 2 glass sheets, and
  not comprising an organic glass sheet based on polymer material such as polycarbonate, poly(methyl methacrylate), material rigid at ambient temperature;
the laminate I optionally being associated either with a glass sheet or with a second laminated assembly II made up of glass sheets assembled by means of thermoplastic interlayer sheets made of thermoplastics such as PVB, EVA, PU, ionomers, cycloolefin polymers, a space being maintained between the laminate I and either the glass sheet or the laminate II,
  the glazing comprising at least 6 glass sheets.

According to this second alternative embodiment, in the event of asymmetry in the number of glass sheets and of interlayer sheets on each side of the fireproof module, it is recommended for the fireproof module to be closer to the leading face than to the protective face, and therefore farther away from said protective face. In this configuration, the fireproof module could clearly contribute toward the dissipation of the impact energy through the rest of the glazing, toward the protective face, and maintain its fireproof function.

For example, according to the first embodiment of the invention, the following structures of the laminate I may be mentioned, in a non-exhaustive manner, (where V=glass sheet; T=thermoplastic interlayer sheet and I=intumescent layer),
  with at least 6 glass sheets and one intumescent layer:
    V-T-V-T-V-I-V-T-V-T-V
    V-T-V-I-V-T-V-T-V-T-V
    V-T-V-T-V-T-V-I-V-T-V
  with at least 6 glass sheets and 2 intumescent layers:
    V-T-V-I-V-I-V-T-V-T-V
    V-T-V-T-V-I-V-I-V-T-V
  with at least 6 glass sheets and 3 intumescent layers:
    V-T-V-I-V-I-V-I-V-T-V
  with at least 7 glass sheets and 2 intumescent layers:
    V-T-V-T-V-I-V-I-V-T-V-T-V
    V-T-V-I-V-I-V-T-V-T-V-T-V
    V-T-V-T-V-T-V-I-V-I-V-T-V
  with at least 8 glass sheets and 3 intumescent layers:
    V-T-V-I-V-I-V-I-V-T-V-T-V-T-V
    V-T-V-T-V-I-V-I-V-I-V-T-V-T-V
    V-T-V-T-V-T-V-I-V-I-V-I-V-T-V.

Structures according to the second alternative embodiment of the present invention include, inter alia, the following structures:
  with at least 6 glass sheets and one intumescent layer:
    V-T-V-I-V-T-V-T-V-T-V
  with at least 6 glass sheets and 2 intumescent layers:
    V-T-V-I-V-I-V-T-V-T-V
  with at least 7 glass sheets and 2 intumescent layers:
    V-T-V-I-V-I-V-T-V-T-V-T-V with at least 8 glass sheets and 3 intumescent layers:
    V-T-V-I-V-I-V-I-V-T-V-T-V-T-V.

Further glass sheets and thermoplastic sheets may be added on either or both sides of the structures described above, depending on the expected protection, without straying from the above-described principle of the present invention.

A glass sheet, or a second laminated assembly II made up of glass sheets assembled by means of thermoplastic interlayer sheets made of thermoplastics such as PVB, EVA, PU, ionomers, cycloolefin polymers, may be added on either side of the structures of the laminate I that are described above, a space being maintained between the laminate I and either the glass sheet or the laminate II. For example,
  V-space-V-T-V-I-V-I-V-T-V-T-V
  V-space-V-T-V-I-V-I-V-T-V-T-V-T-V
  V-space-V-T-V-I-V-I-V-I-V-T-V-T-V-T-V
or
  V-T-V-I-V-I-V-T-V-T-V-T-V-space-V
  V-T-V-T-V-I-V-I-V-I-V-T-V-T-V-space-V,
or
  II-space-V-T-V-I-V-I-V-T-V-T-V-T-V
  II-space-V-T-V-T-V-I-V-I-V-I-V-T-V-T-V,
or
  V-T-V-I-V-I-V-T-V-T-V-space-II
  V-T-V-I-V-I-V-T-V-T-V-T-V-space-II
  V-T-V-I-V-I-V-I-V-T-V-T-V-T-V-space-II,
or any other possible combination according to the present invention.

In the following text, the invention is illustrated by a number of examples.

EXAMPLES

Examples 1 to 18: The structures of the glazings are indicated in the following manner. The glass sheets are represented by the number corresponding to their thickness in millimeters. The intumescent layers of hydrated sodium silicate have a constant thickness of 2 mm and are represented by "/". The interlayer sheets are made of PVB and each have a thickness of 0.76 mm. They are each represented by ":". When several interlayer sheets are superposed, there are as many ":" as there are sheets. The configuration is described such that the leading face is the first sheet on the extreme left-hand side of the glazing, and that the impact propagates in the glazing, in the reading direction (from left to right).

The table also provides the total thickness of the glazing in millimeters and its weight per unit area of 1 m². The ratio of the mass of PVB to the total weight of the glazing is also indicated.

The "bulletproof" quality of the glazings—BR (bullet resistance)—is evaluated according to standard EN 1063. The BR score is given for a given weapon and projectile, depending on the absence of a perforating hole in the structure following impact with the leading face. The notation NS (no splinters) corresponds to an anti-splinter quality, and indicates a bulletproof protective glass "without splinters" on the opposite side during the impact of a projectile. The impact of the projectile is not followed by the projection of glass splinters from the protective face, on the opposite side from the face subjected to this impact. The notation S (splinters) indicates a bulletproof protective glass "with splinters" of glass on the opposite side from the impact of a projectile. The impact of the projectile is followed by the projection of glass splinters from the protective face, on the opposite side from the face subjected to said impact. The "bulletproof" quality of the glazings for examples 1 to 12, 17 and 18 according to the invention is of the type BR NS, while the quality of examples 13 to 16 is of the type S.

Each proposed glazing assembly has two embodiments:
- one intended for interior use which has only the laminated block I,
- one for exterior use forming insulation by addition of a glass sheet II with a thickness of 6 mm 9 mm away from the laminated block I.

| | Structure | Anti-intrusion EN 356 | Fireproof EN 1364 | Bulletproof EN 1063 | thickness mm | weight kg/m² | PVB/total wt % |
|---|---|---|---|---|---|---|---|
| 1 | 4:12:3/8/3:10:6 | P7B | EI 30 | BR5 NS | 52 | 124 | 3.7% |
| 2 | 6 - air9 - 4:12:3/8/3:10:6 | P7B | EI 30 | BR5 NS | 67 | 139 | 3.3% |
| 3 | 4:12:3/8/3:12:12:4 | P7B | EI 30 | BR5 NS | 65 | 155 | 3.7% |
| 4 | 6 - air9 - 4:12:3/8/3:12:12:4 | P7B | EI 30 | BR5 NS | 80 | 170 | 3.3% |
| 5 | 4:12:3/8/3:10:10:4 | P7B | EI 30 | BR5 NS | 61 | 145 | 3.9% |
| 6 | 6 - air9 - 4:12:3/8/3:10:10:4 | P7B | EI 30 | BR5 NS | 76 | 160 | 3.6% |
| 7 | 4:12:8/3:12:12:4 | P7B | EI 30 | BR5 NS | 61 | 145 | 3.9% |
| 8 | 6 - air9 - 4:12:8/3:12:12:4 | P7B | EI 30 | BR5 NS | 76 | 160 | 3.6% |
| 9 | 4:12:3/8/3:12:12:12:4 | P8B | EI 30 | BR6 NS | 78 | 186 | 3.7% |
| 10 | 6 - air9 - 4:12:3/8/3:12:12:12:4 | P8B | EI 30 | BR6 NS | 93 | 201 | 3.4% |
| 11 | 4:12:3/8/3:12:12:10:4 | P8B | EI 30 | BR6 NS | 76 | 150 | 3.0% |
| 12 | 6 - air9 - 4:12:3/8/3:12:12:10:4 | P8B | EI 30 | BR6 NS | 91 | 165 | 2.8% |
| 13 | 12:3/8/3:4:::::4 | P7B | EI 30 | BR5 S | 42 | 97 | 8.2% |
| 14 | 6 - air9 - 12:3/8/3:4:::::4 | P7B | EI 30 | BR5 S | 57 | 112 | 7.1% |
| 15 | 4:12:3/8/3:12::::4 | P7B | EI 30 | BR6 S | 54 | 126 | 5.4% |
| 16 | 6 - air9 - 4:12:3/8/3:12::::4 | P7B | EI 30 | BR6 S | 69 | 141 | 4.8% |
| 17 | 4:8/3:12:12:12:4 | P7B | EI 30 | BR5 NS | 61 | 145 | 3.9% |
| 18 | 6 - air9 - 4:8/3:12:12:12:4 | P7B | EI 30 | BR5 NS | 76 | 160 | 3.6% |

The appended figures schematically show (without respecting the proportions of the different dimensions) examples 1, 2, 7, 8, 9, 10, 15 and 16 of the above table.

As described above, the figures show the composition of different components of the glazings. The thicknesses of the glass sheets are indicated next to them. The space between the laminate I and the glass sheet or the laminate II is recorded in this space, which, as is known, is filled with air or inert gas such as argon. The dimensions are all expressed in millimeters.

Only the intumescent layers 1, the thermoplastic sheets 2 and the spaces 3 are provided with references. The glass sheets are not except for the indication of their thickness. In these figures, the total thickness of the glazing is also indicated under the corresponding figure, in mm.

Each odd figure corresponds to a glazing having only the laminated block I. In the even figures, an additional sheet is added to form a "double" insulating glazing.

FIGS. 7 and 8 (examples 15 and 16) have one intumescent layer while all the others have two intumescent layers. The fire resistance performance for a single layer nevertheless remains satisfactory, the overall structure of the laminate contributing to this performance.

FIGS. 7 and 8 (examples 15 and 16 of the table) have an assembly of 4 thermoplastic sheets.

The number of glass sheets varies in these figures from 7 for FIGS. 1, 3 and 7 (examples 1, 7 and 15) to 10 for FIG. 6 (example 10). In the same way, the examples show a wide variation in the total thickness of the glass sheets, and those of the complete glazing. Thus, the thickness of the glazings varies from 52 mm for FIG. 1 (example 1) to 93 mm for FIG. 6 (example 10).

The glazings according to the invention therefore have the fireproof module, which is made up of 1 to 3 intumescent layer(s), is inserted within a bulletproof glazing, and is flanked on either side by at least one thermoplastic interlayer sheet and at least one glass sheet. In this configuration, the leading face and the protective face are disposed on either side of said fireproof module, each one being separated from the latter by at least one thermoplastic sheet.

In the possible configurations of the glazing according to the invention, the fireproof module may thus be flanked on either side by at least 2 glass sheets and 2 thermoplastic sheets. In other possible configurations, the fireproof module may thus be flanked, independently of whether the side in question is the leading side or the protective side, on one side by at least 2 glass sheets and 2 thermoplastic sheets and on the other side by at least 3 glass sheets and 3 thermoplastic sheets.

On account of its disposition within the bulletproof module, the fireproof module is not likely to be damaged by an impact and is therefore not likely to break and lose its fireproof function. This disposition within the bulletproof module also allows the fireproof module to dissipate the energy produced as a result of an impact with the leading face.

The invention claimed is:

1. A fireproof/bulletproof safety glazing comprising:
    a laminated assembly of glass sheets I, the laminate I,
        the glass sheets of which are assembled by means of thermoplastic interlayer sheets and by means of n layers of intumescent material based on hydrated alkali metal silicate, where $1 \leq n \leq 3$;
        comprising a fireproof module comprising said n layers of intumescent material based on hydrated alkali metal silicate and n+1 glass sheets, said module being flanked on either side by at least one thermoplastic interlayer sheet and at least one glass sheet, and
    not comprising an organic glass sheet based on polymer material rigid at ambient temperature;
    the laminate I optionally being associated either with a glass sheet or with a second laminated assembly II made up of glass sheets assembled by means of thermoplastic interlayer sheets, a space being maintained between the laminate I and either the glass sheet or the laminate II,
    the glazing comprising at least 6 glass sheets.

2. The glazing as claimed in claim 1, wherein the fireproof module is flanked on one side by at least one thermoplastic interlayer sheet and at least one glass sheet and on an opposite side by at least 2 thermoplastic interlayer sheets and at least 2 glass sheets.

3. The glazing as claimed in claim 1, wherein a total thickness of the glass sheets is not less than 35 mm and/or is not greater than 150 mm.

4. The glazing as claimed in claim 1, wherein each of the at least 6 glass sheets has a thickness of at least 2.5 mm.

5. The glazing as claimed in claim 1, wherein the laminate I has two intumescent layers situated on either side of one and the same glass sheet.

6. The glazing as claimed in claim 1, wherein the laminate I comprises at least 3 thermoplastic interlayer sheets, these sheets being separate from one another.

7. The glazing as claimed in claim 6, wherein each of the thermoplastic sheets has a thickness of at least 0.30 mm.

8. The glazing as claimed in claim 6, wherein the laminate I comprises at most 7 thermoplastic interlayer sheets.

9. The glazing as claimed in claim 1, wherein the interlayer sheets have a thickness of at most 3 mm.

10. The glazing as claimed in claim 9, comprising one or two interlayer sheets, each having a thickness greater than 3 mm and less than 8 mm.

11. The glazing as claimed in claim 9, comprising one or two interlayer sheets, each having a thickness greater than 3 mm and less than 6 mm.

12. The glazing as claimed in claim 1, wherein a mass of the assembly of interlayer sheets is at most $1/10$ of a mass of the glazing.

13. The glazing as claimed in claim 1, having one or more thermally or chemically treated glass sheets.

14. The glazing as claimed in claim 13, wherein the treated glass sheet(s) is/are disposed on a face of the glazing that is not exposed to an impact.

15. The glazing as claimed in claim 1, wherein the laminate I is associated with the glass sheet or the laminate II, the space maintained between the glass sheet or the laminate II being from 6 to 14 mm.

16. The glazing as claimed in claim 15, wherein
the glass sheet has a thickness of from 5 to 16 mm, or
the laminate II comprises at most 6 glass sheets, each having a thickness of between 3 and 16 mm.

17. The glazing as claimed in claim 1, wherein the thermoplastic interlayer sheets are made of thermoplastics selected from the group consisting of PVB, EVA, PU, ionomers, and cycloolefin polymers.

18. The glazing as claimed in claim 1, wherein a total thickness of the glass sheets is not less than 40 mm and not greater than 110.

19. The glazing as claimed in claim 1, wherein a mass of the assembly of interlayer sheets is at most $1/20$ of a mass of the glazing.

* * * * *